Jan. 25, 1966   F. J. CARSON ET AL   3,231,352
METHOD OF BENDING GLASS SHEETS WITH A COMPRESSIONAL ZONE
Original Filed April 1, 1959   2 Sheets-Sheet 2
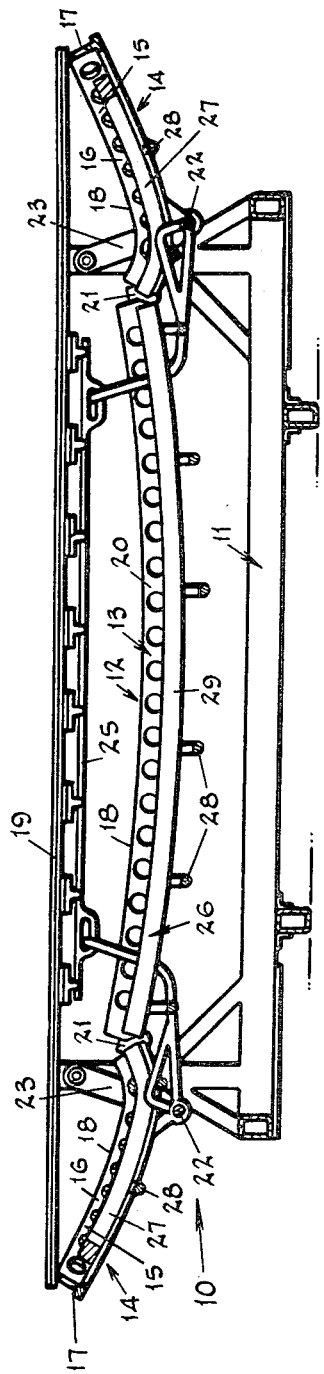
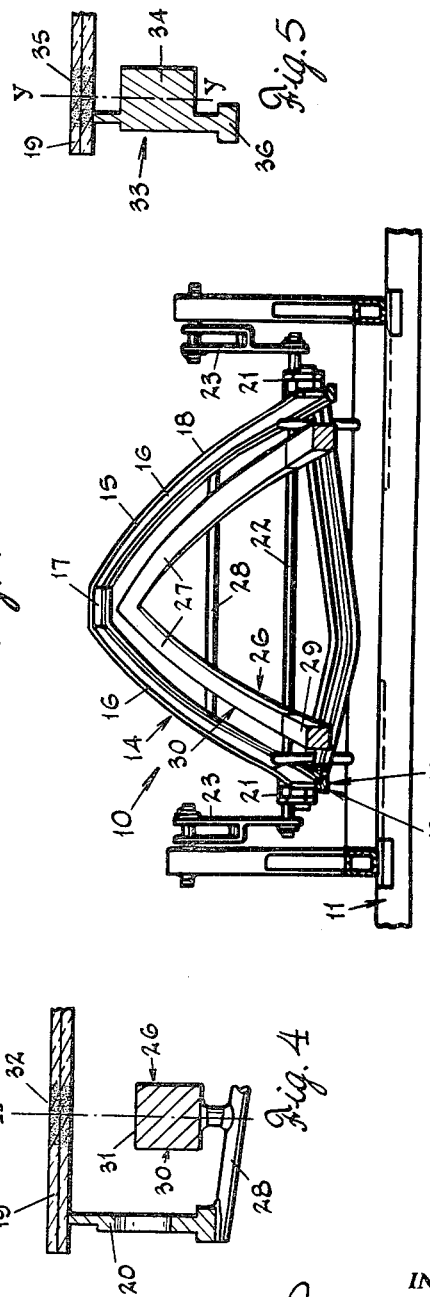
INVENTORS
Frank J. Carson and
BY Herbert A. Leflet, Jr.
Nobbe & Swope
ATTORNEYS United States Patent Office 3,231,352
Patented Jan. 25, 1966

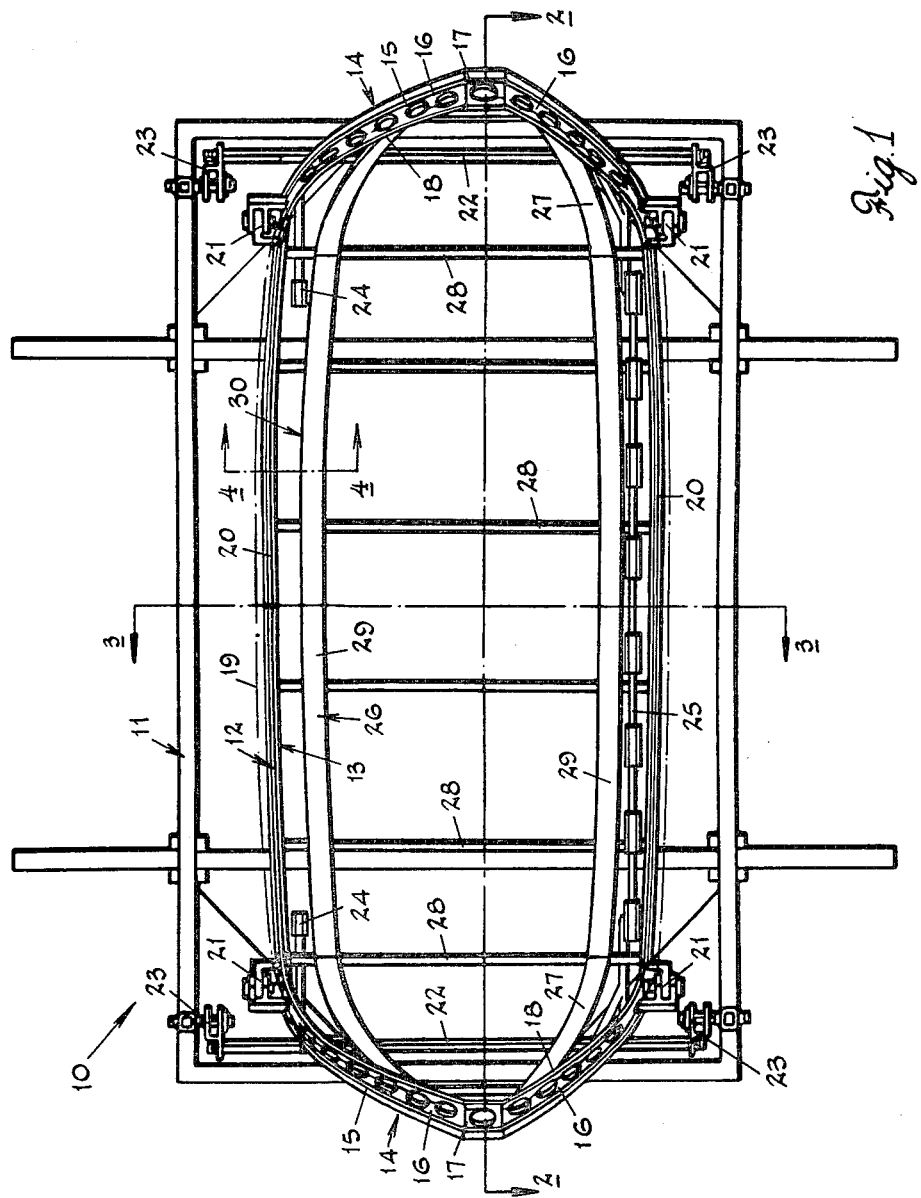

3,231,352
METHOD OF BENDING GLASS SHEETS WITH A COMPRESSIONAL ZONE
Frank J. Carson and Herbert A. Leflet, Jr., Toledo, Ohio, assignors to Libbey-Owens-Ford Glass Company, Toledo, Ohio, a corporation of Ohio
Original application Apr. 1, 1959, Ser. No. 803,440, now Patent No. 3,102,802, dated Sept. 3, 1963. Divided and this application Feb. 14, 1963, Ser. No. 258,464
2 Claims. (Cl. 65—103)

This application is a division of our copending application Serial No. 803,440, filed April 1, 1959, now Patent No. 3,102,802.

The present invention relates generally to the bending of glass sheets.

It has been found extremely desirable to provide bent glass sheets, for example, those to be used in forming windshields, with marginal edges having compression stresses. By providing compression stresses in the edges of the glass sheet, the sheet is more resistant to shock or fracture. In the past, one type of mold adapted to produce such sheets included a shaping rail, and a heat retaining membrane spaced inwardly from the rail and occupying substantially the entire area within the confines of the rail. After a glass sheet is bent upon such a mold and the hot sheet and mold passes through the annealing zone of a furnace, the residual heat within the mold shaping rail and the membrane causes the portions of the glass sheet immediately thereabove to cool at a less rapid rate as compared to the intermediate sheet portion therebetween thereby setting the intermediate sheet portion in compression. After being cooled, the sheet was then cut to pattern outline through the portion thereof set in compression to produce a pattern cut sheet having its edge in compression and thus structurally stronger.

As a result of using such a mold, intermediate tension areas within the pattern cut sheet were produced due to the action of the membrane, which stresses in some instances were found undesirable. By using a bending mold having a substantially continuous heat retaining bar which forms a closed path enclosing an open area at the center of the mold, many of these undesirable stresses were eliminated. This heat retaining bar was spaced inwardly from the mold shaping rail and when the sheet was bent into conformity with the shaping rail, heat which had been retained in both the shaping rail and the bar caused the portions of the sheet immediately thereabove to cool at a slower rate, thus forming a pair of tension bands in the two areas where the cooling had been retarded. Between these tension bands there was formed a compression band in the area where the cooling was not retarded by the retained heat in the shaping rail or the heat retaining bar, and the glass sheet was subsequently cut to final pattern outline through the compression areas.

Even though such a mold eliminated the intermediate tension areas which were produced by the action of the heat absorbing membrane, a tension band was nevertheless formed in the area of the sheet located immediately above the heat retaining bar. While the tension area in contact with the shaping rail was removed by the cutting of the sheet to pattern outline, the tension area above the heat retaining bar remained in the finished windshield.

In accordance with the present invention, however, a bending mold is provided which eliminates tension stresses from the central portion of the pattern cut sheet and thereby produces a structurally stronger sheet.

It is therefore an important object of the present invention to provide a novel and improved bending mold for bending glass sheets.

Another object of the invention is to provide an improved bending mold adapted to set up well oriented areas of stress in a bent glass sheet during the cooling thereof.

A further object of the invention is to provide an improved bending mold adapted to create clearly defined stress areas in the marginal areas of a bent glass sheet while not materially affecting the central portion of the sheet.

A still further object of the invention is to provide an improved shaping rail for a bending mold which includes a heat absorbing portion that removes heat from the portions of the glass sheet that contact the rail.

Other objects and advantages of the invention will become more apparent during the course of the following description when taken in connection with the accompanying drawings.

In the drawings wherein like numerals are employed to designate like parts throughout the same:

FIG. 1 is a plan view of the novel mold of the present invention shown in the closed mold position;

FIG. 2 is a longitudinal sectional view taken along the line 2—2 of FIG. 1 and showing the mold in the open position;

FIG. 3 is a transverse sectional view taken along the line 3—3 of FIG. 1;

FIG. 4 is a partial transverse sectional view taken along the line 4—4 of FIG. 1; and FIG. 5 is a partial transverse sectional view of a modified shaping rail which includes an enlarged heat absorbing portion.

With reference now to the drawings and particularly to FIG. 1, there is shown in plan view the improved glass bending apparatus 10 of the present invention. The apparatus 10 comprises a conventional rectangular rack or frame 11 having corner posts extending upwardly from each of the four corners thereof for supporting a multi-sectioned mold 12 above the frame.

The mold 12 is preferably of alloyed steel construction and comprises a central section 13, and a pair of oppositely disposed movably mounted end sections 14 positioned immediately adjacent opposite ends of the center section 13 and forming substantially continuations thereof.

Each of the mold end sections 14 comprises a substantially triangular or V-shaped shaping rail 15 having a relatively sharp curvature and formed by curved, converging rail portions 16 connected to one another at their outermost ends by a rail portion 17. The rail 15 has a relatively narrow upper surface 18 for receiving a glass sheet or pair of sheets 19 in contact therewith, and in cross section resembles an inverted T.

The glass sheet or pair of sheets 19 have been cut to a pattern block size that has an original outline similar to both the outline of the mold shaping rails and the outline of the patterned sheet to be cut therefrom. A pattern block size sheet is a combination of a block size sheet and a pattern cut sheet and is described as follows:

A block size sheet is usually rectangular and while it may readily be supported on the mold prior to bending, difficulty often arises in supporting those portions of the sheet which overhang the shaping rail inasmuch as the mold shaping rail must follow as closely as possible the outline of the finished pattern because the mold shaping surface defines the configuration to which the sheet is to be bent. Also, those portions of the sheet which are cut therefrom after bending are wasted inasmuch as they have an undesirable curvature.

The problem of waste is alleviated when the flat glass sheet is cut to pattern size before bending, and while the sheet is readily supported on the shaping rail subsequent to bending, difficulties arise in supporting the flat pattern cut sheet on the mold prior to bending. These problems are alleviated by cutting the flat glass sheet prior to bending to a pattern block size which is slightly larger than the desired finished outline of the sheet. A flat glass sheet which has been cut to pattern block size is readily supported upon the mold in the open position and the amount of wasted flat glass is materially reduced. Moreover, the problem of marring or scratching the edge of the sheet is eliminated because these portions are removed from the sheet after it is bent and cut to the finished outline.

The central mold section 13 comprises a pair of substantially straight, spaced shaping rails 20 having a relatively shallow curvature and a relatively narrow shaping surface 18 therein. Each shaping rail 20 is aligned with an innermost end of the substantially V-shaped rail 15 and is connected thereto by a conventionally used hinge 21. The central mold section 13 and the end sections 14 are supported for movement from an open to a closed position by means of pivot bars 22 which are secured to the undersurface of the rails 15 of the mold end sections and extend outwardly therefrom to have their ends rotatably received in the lowermost ends of links 23 that are pivotally supported on the rack 11.

Support arms 24 located at each end of the mold 12 support one side of the sheet 19 while a link type support 25 engages the opposite side of the flat sheet when the mold is in the open position as shown in FIG. 2. During the closing action of the mold, both the support arms 24 and the support 25 move downwardly thus lowering and depositing the glass sheet on the mold.

In accordance with the present invention, a predetermined stress pattern is set up in the glass sheet after it is bent by means of a substantially continuous heat absorbing bar 26 which forms a closed path around the open central portions of the mold 12. The bar 26 is of substantially uniform width which is greater than the width of the shaping surfaces 18 and is carried within the confines of the mold shaping rails 15 and 20. As shown in FIGS. 3 and 4, the bar 26 is spaced inwardly and downwardly from the mold shaping rails. The bar 26 comprises substantially V-shaped end portions 27, carried by the mold end sections 14 by means of rods 28, and aligned substantially straight, spaced central portions 29 carried by the mold center section by means of additional rods 28. In the closed mold position of FIG. 1, the various portions of the heat absorbing bar abut one another to form a substantially continuous structure.

Inasmuch as the bar 26 absorbs heat from the bending furnace as the glass sheet 19 is heated to bending temperature and from those areas of the bent glass sheet adjacent thereto during the annealing of the glass subsequent to bending, the bar 26 must be of substantial mass in order that its temperature is always lower than that of the glass. While it is appreciated that the size of the bar required will vary with the thickness of the glass being bent and will depend upon the type of furnace used, exceptionally good results have been obtained when the bar 26 is formed from a bar of black iron having a square cross section 1 inch to 1½ inches on each side.

As shown in FIGS. 1 and 3, all portions of the outer edge 30 of the heat absorbing bar 26 are spaced a substantially equal distance from adjacent portions of the mold shaping rails. In addition, respective portions of the bar 26 have their upper surfaces contoured to substantially the same curvature as the upper or shaping surface 18 of adjacent portions of the shaping rails, and all portions of the upper surface of the bar 26 are spaced downwardly a substantially equal distance from the upper surface of an adjacent portion of the shaping rails.

In order to have a substantially uniform effect on the glass sheet or sheets by the heat absorbing bar 26, the bar although generally following the curvature of an adjacent rail section is bent or inclined in such a manner that its upper surface 31 is substantially parallel to the upper surface of an adjacent rail section so that, as shown in FIG. 4, the upper surface 31 of the bar is substantially parallel to the portion of the glass sheet 19 immediately thereabove. Thus, the bar produces an even and uniform compression area in the glass sheet by absorbing heat from those areas during annealing.

In bending a glass sheet or pair of sheets with the improved mold of the present invention, the mold is swung to the open position shown in FIG. 2 and the glass sheets 19 are placed thereon. The mold is then passed through a furnace wherein the sheet is heated and bent into conformity with the heated mold, and while the bar 26 absorbs heat from the furnace, it does not reach the temperature of the glass.

After the sheet is bent, the heated mold and bent sheet are passed through a furnace annealing zone having a gradually reduced temperature wherein the sheet is gradually cooled or annealed. During the passage of the mold and bent glass sheet through the furnace annealing zone, the large mass of the bar 26 which has not been heated to the temperature of the glass absorbs heat from the glass which causes the portions 32 of the glass sheet immediately thereabove to cool at a more rapid rate than is the case with the remaining portions of the glass sheet. As a result, this sheet portion cools more rapidly and thus sets in compression.

After being cooled, the glass sheet is removed from the mold and cut to pattern along a line x—x which is coextensive with the center line of both the bar 26 and the compression band 32, thus providing a bent glass sheet having a pattern outline similar to the outline of the mold shaping rails. By absorbing heat from selected portions of the glass sheet during annealing, a bent sheet is produced having its marginal edge set in compression and therefore it is materially stronger.

In the embodiment shown in FIG. 5, there is shown a modified shaping rail 33 having an enlarged heat absorbing section 34 which is substituted for the separate heat absorbing bar 26 illustrated in FIG. 4. The enlarged section 34 is spaced below the shaping surface of the substantially continuous shaping rail 33 that contacts the glass sheets 19 and the section 34 encloses an open area which is spaced inwardly from the shaping surface.

The enlarged heat absorbing section 34 functions in the same manner as the separate heat absorbing bar 26 and withdraws heat from the portion 35 of sheets 19 which are immediately adjacent and in contact with the shaping surface. Because the section 35 cools at a faster rate than the remainder of the sheet 19, a compression band is formed in this portion. As in the case of the bar 26, the enlarged section of the modified shaping rail 33 must have a sufficient mass to prevent it from becoming heated to the temperature of the glass and, as seen in FIG. 5, the width of the section 35 is substantially greater than the width of the relatively narrow shaping surface.

After the sheet 19 is cooled it is removed from the mold 12 and cut to the finished pattern outline along the line y—y which is coextensive with the center lines of both the compression band 35 and the enlarged section 34. Inasmuch as the sheet 19 may be marked or scratched by the shaping surface of the rail 33, it is necessary to remove the portion of the sheet that was in actual contact with this surface as the glass is cut to the finished pattern outline. As shown in FIG. 5, this is accomplished by offsetting the enlarged section from the sheet engaging surface toward the center of the mold. Thus, the portion of the sheet 19 in actual contact with the rail 33 is offset outwardly from the center y—y of the compression band 35 and when the glass is cut to the finished outline along the line y—y, the portion of the sheet that had been in engagement with the rail 33 is removed.

In order to adequately support the mass of the enlarged section 34 and prevent distortion of the shaping surface, the rail 33 has an enlarged section 36 spaced from the section 34. The section 36 extends laterally along the bottom of the rail 33 and is spaced from the section 34 to reinforce the rail.

We claim:

1. In a method of producing a bent glass sheet in which an entire flat glass sheet is first heated to bend the same into contact with the shaping rail of an outline type bending mold and the bent sheet is then annealed while supported on said mold shaping rail; the steps of retarding said heating along a restricted elongated predetermined area of said glass sheet lying inwardly of said shaping rail during heating of said entire sheet, and withdrawing heat from said sheet along said elongated restricted predetermined area at a faster rate than from the rest of said sheet during said annealing of the bent glass sheet.

2. In a method of producing a pattern-cut bent and annealed glass sheet in which a flat block size glass sheet, while supported above a shaping rail of an outline type bending mold, is first heated to bend the same against said rail, the bent sheet is then permitted to cool to anneal the same, and a pattern is finally cut from the bent and annealed sheet; the steps of retarding the heating of a restricted elongated predetermined area of said glass sheet lying inwardly of said shaping rail during said heating of the block size sheet, absorbing heat from said elongated restricted predetermined area of said glass sheet at a faster rate than from the rest of the sheet during said annealing of the bent sheet, and pattern cutting said bent and annealed sheet along a line within said restricted area of said sheet.

References Cited by the Examiner

UNITED STATES PATENTS

| | | | |
|---|---|---|---|
| 2,897,632 | 8/1959 | Fowler et al. | 65—103 |
| 3,081,209 | 3/1963 | Do Huu Chan et al. | 65—115 X |
| 3,092,481 | 6/1963 | Carson | 65—288 |

DONALL H. SYLVESTER, *Primary Examiner.*